(12) United States Patent
Riionheimo

(10) Patent No.: US 8,023,700 B2
(45) Date of Patent: Sep. 20, 2011

(54) APPARATUS, METHOD, COMPUTER PROGRAM AND USER INTERFACE FOR ENABLING ACCESS TO FUNCTIONS

(75) Inventor: Tanja Riionheimo, Helsinki (FI)

(73) Assignee: Nokia Corporation, Espoo (FI)

( * ) Notice: Subject to any disclaimer, the term of this patent is extended or adjusted under 35 U.S.C. 154(b) by 1042 days.

(21) Appl. No.: 11/881,485

(22) Filed: Jul. 26, 2007

(65) Prior Publication Data
US 2009/0028395 A1    Jan. 29, 2009

(51) Int. Cl.
| G05B 19/00 | (2006.01) |
| G05B 23/00 | (2006.01) |
| G06K 9/00 | (2006.01) |
| G06F 7/00 | (2006.01) |
| G06F 7/04 | (2006.01) |
| G06F 21/00 | (2006.01) |
| G06F 3/041 | (2006.01) |
| G06T 1/00 | (2006.01) |
| G06T 7/00 | (2006.01) |
| G08B 29/00 | (2006.01) |
| G08C 19/00 | (2006.01) |
| H04B 1/00 | (2006.01) |
| H04B 3/00 | (2006.01) |
| H04Q 1/00 | (2006.01) |
| H04Q 9/00 | (2006.01) |

(52) U.S. Cl. ....... 382/116; 382/115; 382/124; 340/5.53; 713/186; 345/173

(58) Field of Classification Search .................. None
See application file for complete search history.

(56) References Cited

U.S. PATENT DOCUMENTS
| 2005/0085217 A1* | 4/2005 | Lim .............................. 455/410 |
| 2006/0284853 A1* | 12/2006 | Shapiro ........................ 345/173 |
| 2007/0012758 A1* | 1/2007 | Wilson .......................... 235/379 |
| 2007/0140530 A1* | 6/2007 | Coogan et al. ............... 382/115 |
| 2008/0016371 A1* | 1/2008 | Jiang et al. ................... 713/186 |

FOREIGN PATENT DOCUMENTS
KR    20080002203 A    1/2008

* cited by examiner

Primary Examiner — Tom Lu
Assistant Examiner — Thomas Conway
(74) Attorney, Agent, or Firm — Harrington & Smith

(57) ABSTRACT

An apparatus including a memory for storing information associating a fingerprint input with a function of the apparatus; a user input device including a device for detecting a multi-fingerprint input, the multi-fingerprint input including a plurality of fingerprints where each fingerprint is associated with a different function of the apparatus; and a processor configured to identify the plurality of fingerprints within the multi-fingerprint input and, in response to the identification of the plurality of fingerprints, determine a function associated with the multi-fingerprint input and enable access to that function, wherein the function associated with the multi-fingerprint input is a combination of the functions associated with the plurality of fingerprints within the multi-fingerprint input.

29 Claims, 5 Drawing Sheets

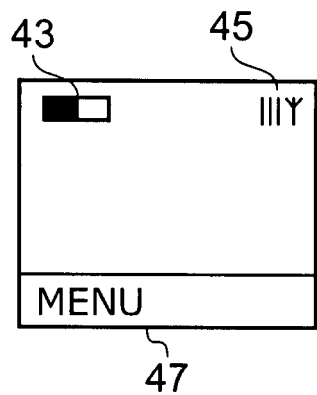
FIG. 3A
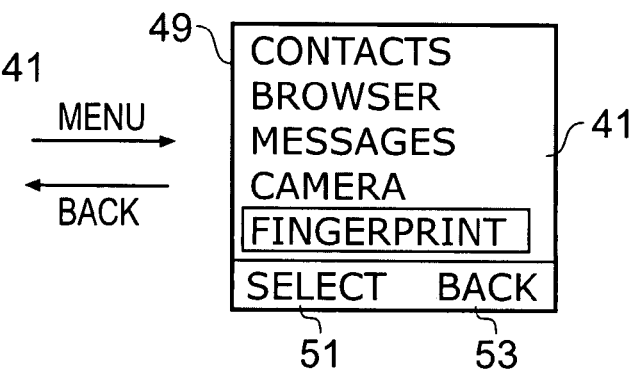
FIG. 3B
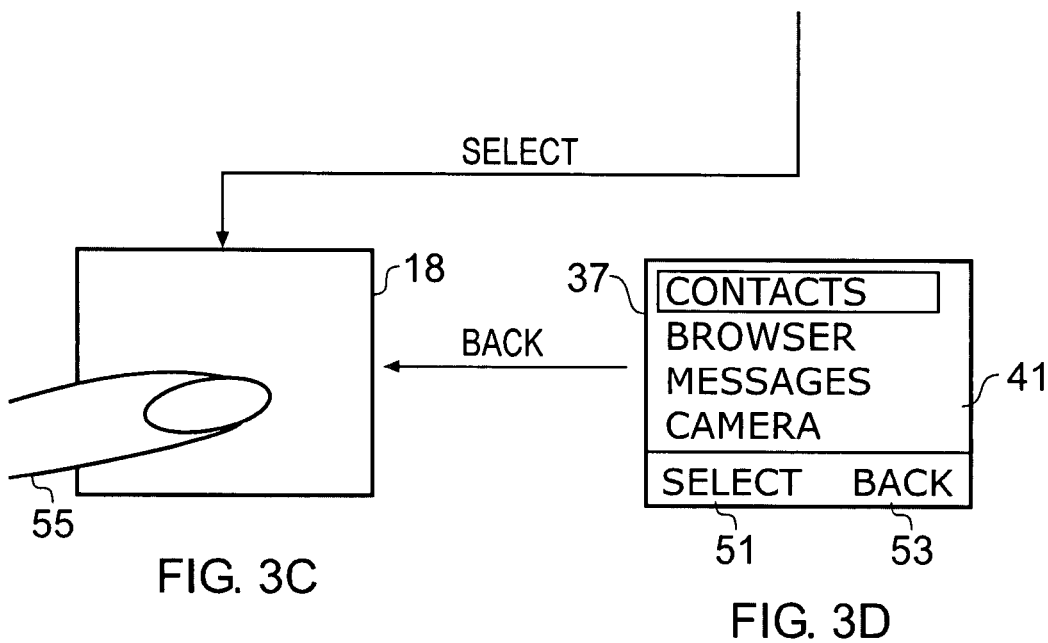
FIG. 3C
FIG. 3D
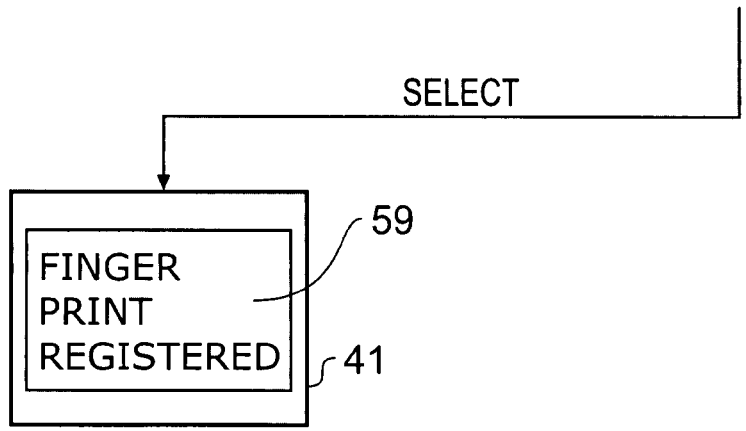
FIG. 3E

APPARATUS, METHOD, COMPUTER PROGRAM AND USER INTERFACE FOR ENABLING ACCESS TO FUNCTIONS

FIELD OF THE INVENTION

Embodiments of the present invention relate to an apparatus, method, computer program and user interface for enabling access to functions. In particular, they relate to an apparatus, method, computer program and user interface for enabling access to functions in response to a fingerprint input.

BACKGROUND TO THE INVENTION

Many electronic apparatus have a large number of functions and are capable of storing many different types of information. For example a mobile cellular phone typically has several different communications functions including making a telephone call, SMS messages, MMS messages, Bluetooth messaging and internet access, as well as other functions such as camera functions, a music player and calendar functions. The phone is also able to store information relating to each of these functions for example, contact information, received and sent messages, digital images captured by the camera and audio files.

Typically a user can access the various functions of the apparatus via a menu or a list of options. However as the number of functions of the apparatus increases and more information is stored on the device the number of options stored in the menu also increases which makes the menu more complicated and laborious to navigate.

Also if a user wishes to access more than one function or piece of information to complete a task they may need to navigate through more than one menu. for example if a user wishes to send an SMS message to a number stored in their contact information they may first have to navigate through a menu to access the SMS message function and then navigate through a list of contact information to access the required contact details or vice versa, they may first have to access the contact details and then navigate through a menu to the SMS message function.

Many apparatus provide shortcuts to certain functions which enable a user to access to certain functions more quickly. However the number of shortcuts which can be provided is limited by the user input device of the apparatus.

It would be beneficial to provide an apparatus which enables a user to quickly access a large range of functions of the apparatus.

BRIEF DESCRIPTION OF THE INVENTION

According to one embodiment of the invention there is provided an apparatus comprising: a memory for storing information associating a fingerprint input with a function of the apparatus; a user input device comprising a device for detecting a multi-fingerprint input, the multi-fingerprint input comprising a plurality of fingerprints where each fingerprint is associated with a different function of the apparatus; and a processor configured to identify the plurality of fingerprints within the multi-fingerprint input and, in response to the identification of the plurality of fingerprints, determine a function associated with the multi-fingerprint input and enable access to that function, wherein the function associated with the multi-fingerprint input is a combination of the functions associated with the plurality of fingerprints within the multi-fingerprint input.

This provides the advantage that a user can quickly access a large number of functions using multi-fingerprint inputs. As there are a large number of combinations of multi-fingerprint inputs which may be made there are a large number of possible shortcuts to functions which may be provided.

Also as the multi-fingerprint input enables access to a function which is a combination of the functions associated with each of the fingerprints within the multi-fingerprint input this enables access to more specific functions and may enable a user to avoid having to navigate through multiple menus to complete a task.

As the function associated with the multi-fingerprint input is a combination of the functions associated with each of the individual fingerprints within the multi-fingerprint input this also makes the apparatus more intuitive for the user to use as they do not need to remember which functions are associated with every possible multi-fingerprint input because it can be easily deduced from the functions associated with each of their fingerprints.

Furthermore, as fingerprint information is used to access the functions of the apparatus and this information is unique to the user of the apparatus this provides an added level of security to the apparatus.

In some embodiments of the invention the user input device may enable a user to program the apparatus by assigning functions to each of their fingerprints. This provides the advantage that it enables a user to personalize the apparatus so that the multi-fingerprint inputs provide access to the functions which they use most often and that the multi-fingerprint inputs are the most intuitive inputs for the user.

In some embodiments at least one fingerprint within the multi-fingerprint input is associated with an application function and at least one fingerprint is associated with a parameter function. An application function is a function associated with a particular application of the apparatus such as a communications function or internet browsing. An application function may be a general application, for example all messaging functions, or a subset of functions within a general application, for example SMS messaging. A parameter function is an item or items of information which may be used to implement an application function. For example a parameter function may be contact information such as phone numbers or URL addresses which can be used to send a message or access a website.

According to another embodiment of the invention there is provided a method comprising: detecting a multi-fingerprint input comprising a plurality of fingerprints where each individual fingerprint is associated with a different function of an apparatus; identifying the plurality of fingerprints within the multi-fingerprint input; determining, in response to the identification of the plurality of fingerprints, a function associated with the multi-fingerprint input where the function associated with the multi-fingerprint input is a combination of the functions associated with the plurality of fingerprints within the multi-fingerprint input; and enabling access to the function associated with the multi-fingerprint input.

According to another embodiment of the invention there is provided a computer program comprising program instructions for controlling an apparatus, the apparatus comprising, a memory for storing information associating a fingerprint input with a function of the apparatus, and a user input device comprising a device for detecting a multi-fingerprint input, the program instructions providing, when loaded into a processor: means for detecting a multi-fingerprint input comprising a plurality of fingerprints where each individual fingerprint is associated with a different function of an apparatus; means for identifying the plurality of fingerprints within the multi-fingerprint input; means for determining, in response to the identification of the plurality of fingerprints, a function associated with the multi-fingerprint input where the function is a combination of the functions associated with the plurality of fingerprints within the multi-fingerprint input; and means for enabling access to the function associated with the multi-fingerprint input.

According to another embodiment of the invention there is provided a user interface comprising: a device for detecting a multi-fingerprint input, the multi-fingerprint input comprising a plurality of fingerprints where each fingerprint is associated with a different function of the apparatus; wherein, the user interface is configured, in response to the detection of the multi-fingerprint input, to enable access to a function associated with the multi-fingerprint input and wherein the function associated with the multi-fingerprint input is a combination of the functions associated with the plurality of fingerprints within the multi-fingerprint input.

The apparatus may be for wireless communication, accessing the internet, viewing mobile television or for storing information such as digital images or audio files etc. The functions of the apparatus may be accessible via fingerprint inputs.

BRIEF DESCRIPTION OF THE DRAWINGS

For a better understanding of the present invention reference will now be made by way of example only to the accompanying drawings in which:

FIGS. 3A to 3E illustrate a first method of associating a function of the apparatus with a fingerprint according to an embodiment the present invention;

DETAILED DESCRIPTION OF EMBODIMENTS OF THE INVENTION

Figure 1:
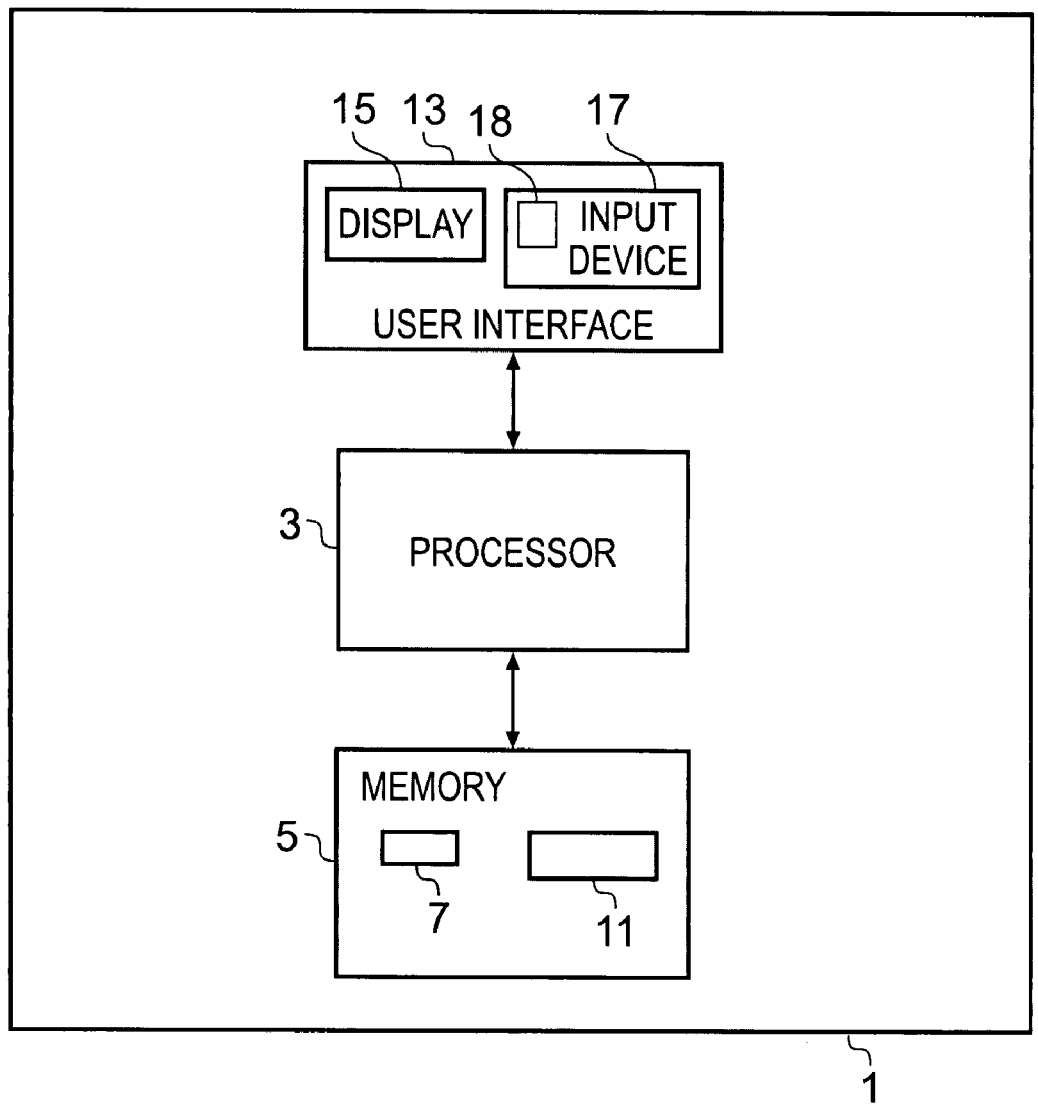
FIG. 1 schematically illustrates an electronic apparatus.

The Figures illustrate an apparatus 1 comprising: a memory 5 for storing information 11 associating a fingerprint input with a function of the apparatus 1; a user input device 17 comprising a device 18 for detecting 23 a multi-fingerprint input, the multi-fingerprint input comprising a plurality of fingerprints where each fingerprint is associated with a different function of the apparatus 1; and a processor 3 configured to identify 25 the plurality of fingerprints within the multi-fingerprint input and, in response to the identification of the plurality of fingerprints, determine 31 a function associated with the multi-fingerprint input and enable 33 access to that function, wherein the function associated with the multi-fingerprint input is a combination of the functions associated with the plurality of fingerprints within the multi-fingerprint input.

FIG. 1 schematically illustrates an electronic apparatus 1. Only the features referred to in the following description are illustrated. It should, however, be understood that the apparatus 1 may comprise additional features that are not illustrated. The electronic apparatus 1 may be, for example, a mobile cellular telephone, a personal computer, a personal digital assistant, a digital camera, a personal music player or any other electronic apparatus that enables a user to make fingerprint inputs to control the apparatus.

The illustrated electronic apparatus 1 comprises: a user interface 13, a memory 5 and a processor 3. The processor 3 is connected to receive input commands from the user input device 17 and to provide output commands to the display 15. The processor 3 is also connected to write to and read from the memory 5.

The user interface 13 comprises a display 15 and a user input device 17. The user input device 17 further comprises a device 18 for detecting fingerprint inputs. The device 18 may be operable to detect fingerprint inputs comprising single fingerprints and also multi-fingerprint inputs comprising a plurality of fingerprints.

The device 18 for detecting fingerprint inputs may comprise, for example, a touch sensitive area of the display 15 which is operable to scan a users fingertip to obtain information of the users fingerprint or a portion of the users fingerprint so that the users finger can be uniquely identified from that fingerprint information. The fingerprint information may then be stored in the memory 5.

The user input device 17 may also comprise any means which enables a user to input information into the apparatus 1. For example, the user input device 17, may comprise a keypad such as an ITU-T keypad, a joystick, a roller, or a touch sensitive region of the display 15. The user input device 17 may also enable a user to access the functions of the apparatus 1, for example in embodiments where the electronic apparatus 1 is a mobile cellular telephone the user input device 17 may enable a user to make and receive telephone calls.

The display 15 may be operable to display information to a user. This information may be, for example, information which has been input by a user via the user input device 17 or information which is stored in the memory 5.

The memory 5 stores computer program instructions 7, which when loaded into the processor 3, enable the processor 3 to control the operation of the apparatus 1 as described below. The computer program instructions 7 provide the logic and routines that enables the electronic apparatus 1 to perform the method illustrated in FIG. 2.

The memory also stores information 11 which associates the fingerprints of the user of the apparatus 1 with selected functions of the apparatus 1. This information 11 enables the processor 3 to identify the fingerprints used in a fingerprint input and determine the function to be accessed.

The computer program instructions 7 may arrive at the electronic apparatus 1 via an electromagnetic carrier signal 19 or be copied from a physical entity 21 such as a computer program product, a memory device or a record medium such as a CD-ROM or DVD.

Figure 2:
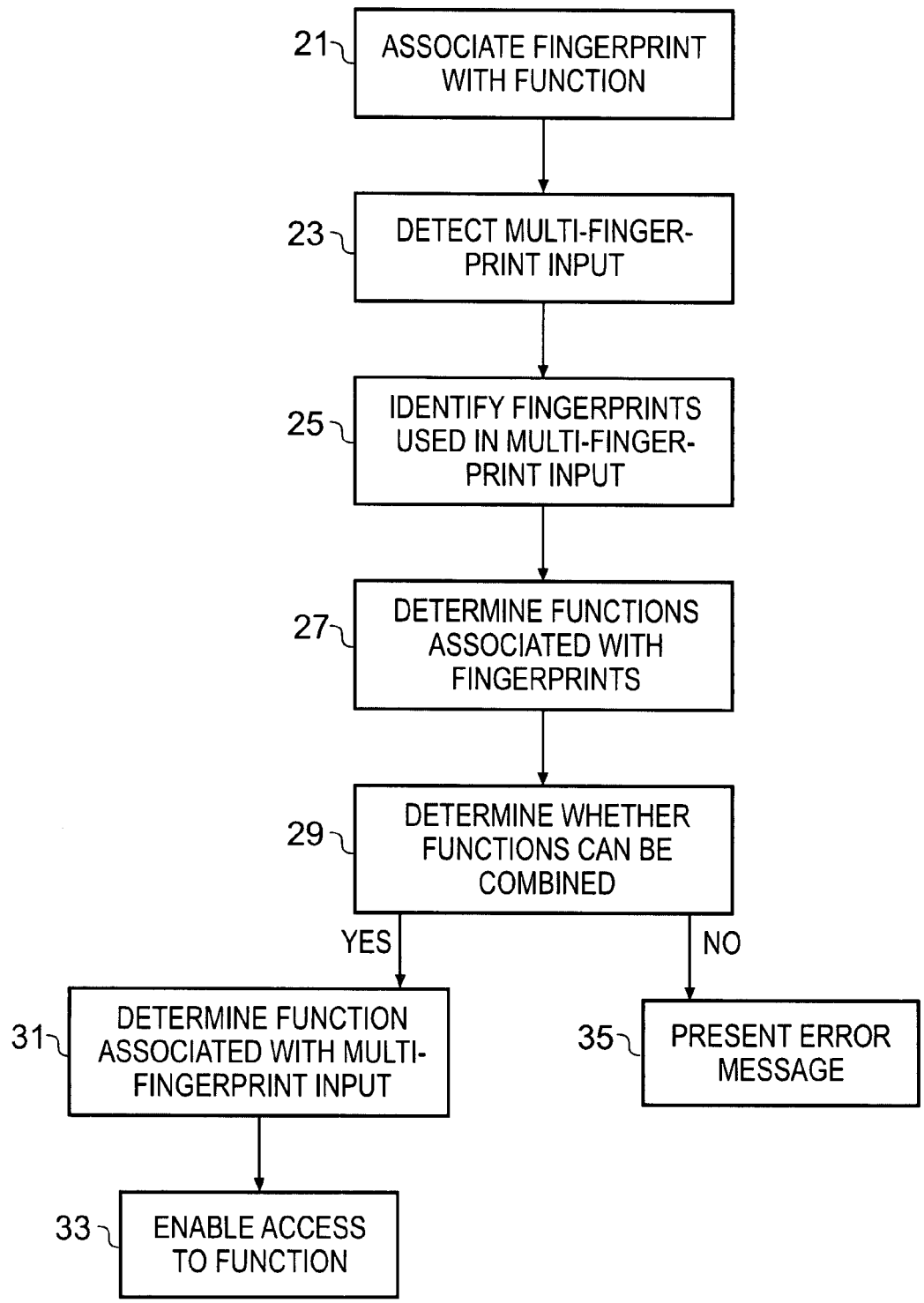
FIG. 2. illustrates a flow chart showing method steps of an embodiment of the present invention.

A method of controlling the apparatus 1, according to the present invention, is illustrated schematically in FIG. 2.

At block 21 a user registers their fingerprints with the apparatus 1. This may be achieved by pressing a finger on the fingerprint input device 18 so that the processor 3 can obtain information relating to the fingerprint to enable the processor 3 to uniquely identify the finger. The user may also select a function to associate with each of their fingerprints. The information 11 which associates a fingerprint with a selected function may be stored in the memory 5 of the apparatus 1.

A fingerprint may be the print of any of the digits on a users hand, for example any of the fingers or thumbs. A user may register the prints of all of their fingers and thumbs or just a selection of their fingers and thumbs.

At block 23 the processor 3 detects that a user has made a multi-fingerprint input on the fingerprint input device 18. The multi-fingerprint input may comprise a user pressing a plurality of fingers on the fingerprint input device 18 simultaneously. Alternatively the multi-fingerprint input may comprise a user pressing their fingers against the fingerprint input device 18 sequentially. For example a user may make a multi-fingerprint input by pressing two or more of their fingers against the fingerprint input device 18 one at a time.

In response to the detection of the multi-fingerprint input the processor 3 will, at block 25, identify the fingers which were used in the multi-fingerprint input. This may be achieved by comparing the fingerprint information received in the multi-fingerprint input with the fingerprint information 11 input by the user at block 21 and stored in the memory 5.

Once the processor 3 has identified the fingerprints used in the multi-fingerprint input the processor 3 will determine, at block 27, the functions that are associated with the identified fingerprints. This may be achieved by accessing the information 11 which associates the registered fingerprints with selected functions.

Once the processor 3 has determined the functions associated with each of the fingerprints within the multi-fingerprint input the processor 3 will then determine, at block 29, whether or not those functions can be combined to provide another function.

In order to determine whether or not the functions can be combined the processor 3 may determine whether at least one of the fingerprints is associated with an application function and if at least one of the fingerprints is associated with a parameter function. The processor 3 will then determine whether or not the parameter function comprises at least one item of information which can be used to implement the application function.

For example the processor 3 may determine that a first function associated with a first fingerprint in the multi-fingerprint input is a parameter function comprising a set of contact information and that a second function associated with a second fingerprint in the multi-fingerprint input is an application function to access a web browser. At step 29 the processor 3 may determine whether or not the contact information contains information such as a URL address which is suitable for use with the web browser. If the contact information does include any information which is suitable for use with the browser function then the processor 3 will determine that the functions can be combined whereas if the contact information does not include any information that is suitable for use with the browser function then the processor 3 will determine that the functions cannot be combined.

If the functions can be combined then the processor 3 will move to block 31 and determine what the combination of the functions is and then, at block 33, enable access to the determined function. The processor 3 may enable access to the function by providing a shortcut to the function.

In the above mentioned example the processor 3 may combine the functions of a set of contact information and a web browser by establishing a connection to the file or website and thereby providing a shortcut to a file or website associated with the URL contained in the contact information.

If the processor 3 determines 29 that the functions associated with each of the individual fingerprints within the multi-fingerprint input cannot be combined then the processor 3 moves to block 35 and presents an error message on the display 15 which indicates to the user that there is no function corresponding to the multi-fingerprint input which was made.

In other embodiments of the invention, if the processor 3 determines that the functions associated with each of the individual fingerprints within the multi-fingerprint input cannot be combined then the processor 3 will simply configure the apparatus to perform one of the functions associated with one of the fingerprints. Alternatively the processor may not provide any function or message and simply return to the mode in which it is ready to receive a multi-fingerprint input.

The blocks illustrated in FIG. 2 may represent steps in a method and/or sections of code in the computer program 7. The illustration of a particular order to the blocks does not necessarily imply that there is a required or preferred order for the blocks and the order and arrangement of the blocks may be varied.

FIGS. 3 to 6 illustrate examples of a graphical user interface according to an embodiment of the present invention. In the particular embodiments illustrated the apparatus is a communications device such as a mobile cellular telephone. However it is to be appreciated that the invention may be incorporated in any apparatus which is operable to receive multi-fingerprint inputs.

FIG. 3 illustrates a method of associating 21 a fingerprint with a function of the apparatus 1. FIG. 3A illustrates a graphical user interface 41 which is presented by the display 15. The graphical user interface 41 may be used in a communication device such as a mobile cellular telephone.

The graphical user interface 41 comprises a first icon 43 indicative of the power remaining in the power source of the apparatus 1 and a second icon 45 indicative of the signal strength of a signal received by the apparatus 1. The graphical user interface 41 also comprises a user selectable icon "menu" 47 which enables a user to access the menu of the apparatus 1. A user may select the user selectable icon "menu" 47 using the user input device 17. For example a user may actuate a key of a key pad or touch a specific region of a touch sensitive display.

When a user selects the menu icon 47 the processor 3 configures the apparatus 1 so that the graphical user interface 41 illustrated in FIG. 3B is presented on the display 15. The graphical user interface 41 now comprises a list 49 of user selectable options associated with the functions of the apparatus 1. For clarity only a portion of the list 49 is illustrated in FIG. 3B. A user may use the user input device 17 to navigate through the list 49. As a user navigates through the list 49 the different options in the list 49 become highlighted. For example, in the particular instance illustrated in FIG. 3B the user has scrolled down the list 49 to the option "Fingerprint" and so this option is highlighted.

The graphical user interface 41 also comprises two user selectable icons "select" 51 and "back" 53. These may be selected using the user input device 17. If a user selects the "select" icon 51 this will cause the highlighted option in the list 49 to be selected and either access the particular function or enter a further menu level. If the user selects the "back" icon 53 this will cause the apparatus 1 to leave the menu and return to the graphical user interface 41 illustrated in FIG. 3A.

When a user selects the "fingerprint" option the processor 3 configures the apparatus 1 so that the fingerprint input device 18 is ready to receive a fingerprint input as illustrated in FIG. 3C. The user makes a fingerprint input by pressing their finger 55 against the fingerprint input device 18 so that the fingerprint input device 18 can scan the tip of the finger 55 and obtain fingerprint information sufficient to uniquely identify the finger 55.

In the embodiment illustrated in FIG. 3C the user is registering the index finger of their left hand. It is to be appreciated that the user could register any of their fingers and thumbs.

In the particular embodiment illustrated in FIG. 3C the fingerprint input device 18 is a portion of the display 15 and no information is presented on the display 15 while the fingerprint input is being received. In other embodiments the fingerprint input device 18 may be separate to the display 15 and the display may present instructions to the user while the fingerprint input is being made.

When a user has finished making the fingerprint input the processor 3 controls the apparatus 1 so that the graphical user interface 41 illustrated in FIG. 3D is presented on the display 15. This graphical user interface 41 comprises a list 57 of user selectable options relating to functions which may be associated with the fingerprint which has just been input. A user may navigate through the list 57 using the user input device 17.

The graphical user interface 41 also comprises the user selectable icons "select" 51 and "back" 53 which can be selected using the user input device 17. Selecting the select icon 51 causes the highlighted option in the list 57 to be associated with the fingerprint which has just been input. Selecting the back icon 53 enables a user to cancel the input fingerprint and make another fingerprint input.

FIG. 3E illustrates the graphical user interface 41 that is presented to a user once they have selected the function to be associated with the input fingerprint. This graphical user interface 41 comprises a message 59 indicating that the input fingerprint has been successively registered with the selected function. Information 11 associating the selected function with the input fingerprint is then stored in the memory 5.

It is to be appreciated that the menu of functions may comprise several levels and the functions associated with the fingerprints may be selected from any level of the menu. For example the function may be a general function selected from the list 49, for example, contacts. Alternatively the function may be subset of functions within the general function such as a specific set of contact details and may be selected from a lower menu level.

FIG. 4 illustrates another method of registering a function of the apparatus 1 with a fingerprint. FIG. 4A illustrates the same graphical user interface 41 as illustrated in FIG. 3A. The graphical user interface 41 comprises the icon 43 indicative of the power remaining in the power source, the icon 45 indicative of the strength of a signal received by the apparatus 1 and also the user selectable menu icon 47 which enables a user to enter the menu of the apparatus 1.

Figure 4A:
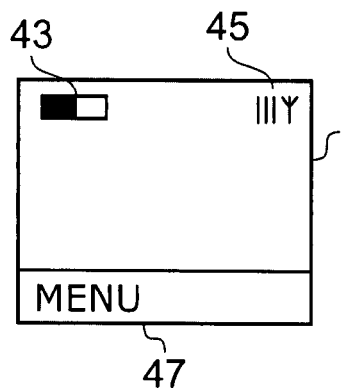
FIGS. 4A to 4E illustrate a second method of associating a function of the apparatus with a fingerprint according to a second embodiment of the present invention.
Figure 4B:
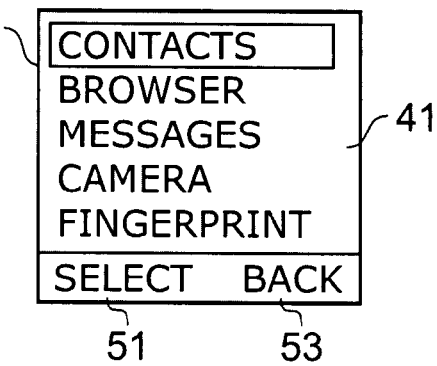

FIG. 4B illustrates the graphical user interface 41 which is presented to the user in response to selection of the menu icon 47 in FIG. 4A. This graphical user interface 41 comprises the list 49 of user selectable options associated with the function of the apparatus 1 and the select icon 51 and back icon 53 as also illustrated in FIG. 3B.

In the method illustrated FIG. 4 the user has navigated through the menu so that the option "contacts" is highlighted. When the user selects the select icon 51 the graphical user interface 41 illustrated in FIG. 3C is presented to the user. The graphical user interface illustrated in FIG. 3C comprises a list 61 of user selectable options relating to specific functions associated with the contacts function. The graphical user interface 41 also comprises the "select" icon 51 which enables the user to select the highlighted option in the list 61 and the "back" icon 53 which enables a user to exit the graphical user interface 41 illustrated in FIG. 4C and return to the graphical user interface illustrated in FIG. 4B.

Figure 4C:
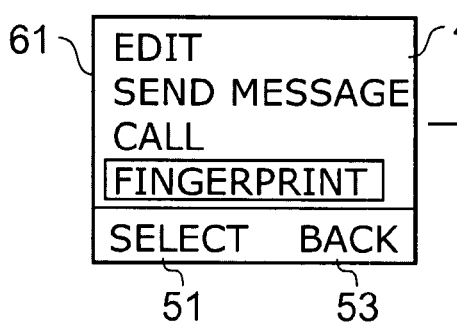
Figure 4D:
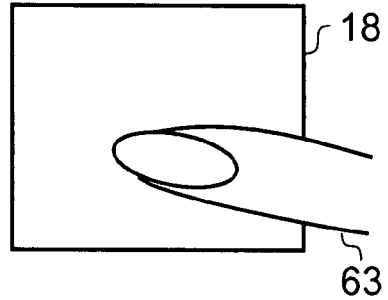

In FIG. 4C the user has navigated through the list 61 so that the option "fingerprint" is highlighted. When the user selects this option the processor 3 configures the apparatus 1 so that the fingerprint input device 18 is ready to receive a fingerprint input as illustrated in FIG. 4D.

In the method illustrated in FIG. 4 the user makes a fingerprint input using their right index finger 63. This causes the fingerprint of their right index finger 63 to be associated with function contacts which was the function selected from the list 49 of functions of the apparatus 1.

Figure 4E:
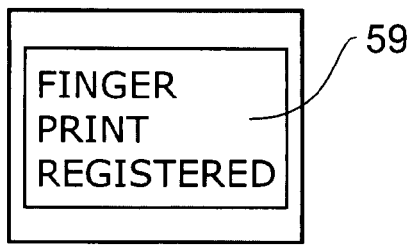

Once the fingerprint input is completed the graphical user interface 41 illustrated in FIG. 4E is presented to a user. This graphical user interface 41 comprises a message 59 indicating that the input fingerprint has been successfully registered with the selected function and information 11 associating the selected function with the input fingerprint is stored in the memory 5.

Once a user has registered their fingerprint with a specific function they can use that fingerprint input to quickly access that function without having to navigate through the menu. For example, if a user has registered the index finger of their left hand to be associated with the function of SMS messages then whenever the user makes a fingerprint input using their left index finger they may be provided with a blank SMS message template. Alternatively if the user has registered the index finger of their right hand with a particular set of contact details then whenever the user makes a fingerprint input using their right index finger the processor 3 may control the apparatus 1 to present the contact information on the display 15.

As a user can select the functions which they want to associate with their fingers this allows the device to be personalized in accordance with the user's preferences. This may be particularly advantageous where there is more than one user of the apparatus 1 as it allows each user to have their own personal set of shortcuts.

FIG. 5 illustrates a method of enabling access to the functions of the apparatus 1 using a multi-fingerprint input comprising two fingerprints.

Figure 5A:
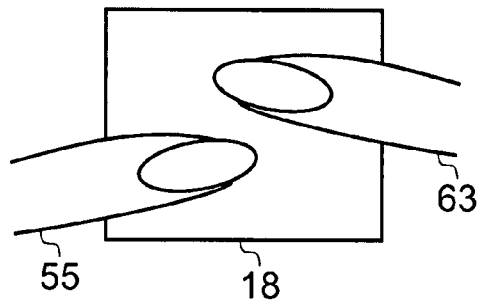
FIGS. 5A and 5B illustrate a method of making a multi-fingerprint input according to an embodiment of the present invention.

In FIG. 5A the user makes a multi-fingerprint input. In the particular embodiment illustrated in FIG. 5A the multi-fingerprint input comprises the user pressing their left index finger 55 and their right index finger 63 on the fingerprint input device 18 simultaneously. In other embodiments a multi-fingerprint input may be made by pressing the fingers on the fingerprint input device 18 sequentially. It is to be appreciated that although the two index fingers are used in this example, the multi-fingerprint input could comprise any two of the users fingers and thumbs.

The processor 3 will identify the fingerprints used in the multi-fingerprint input and will determine which functions are associated with those fingerprints. Once the processor 3 has determined the functions associated with the left index finger 55 and the right index finger 63 the processor 3 will determine the function which is the combination of those functions enable access to that function. For example, in the particular embodiment illustrated in FIG. 5 the left index finger 55 is associated with the function of sending an SMS message and the right index finger 63 is associated with the contact details for the user's friend Mary. In response to the multi-fingerprint input the processor 3 will determine whether or not the contact information for Mary includes an address, such as a mobile telephone number, to which an SMS message may be sent. If the contact information does include a suitable address then the processor 3 will determine that the function associated with the multi-fingerprint input is sending an SMS message to Mary and will provide a graphical use interface 41 comprising an SMS message template 69 which is addressed to Mary as illustrated in FIG. 5B.

Figure 5B:
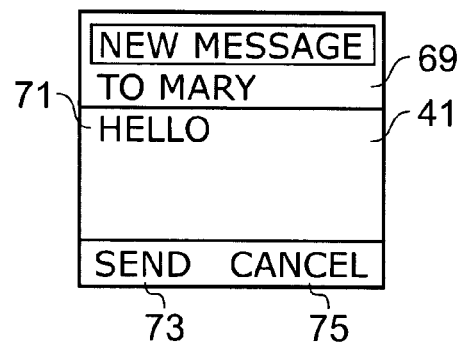

The graphical user interface 41 illustrated in FIG. 5B comprises a portion where the message 71 input by the user is presented. The graphical user interface 41 also comprises a user selectable option "send" 73 and a user selectable option "cancel" 75.

Once the user has finished writing the message 71 they wish to send to Mary the user sends the message 71 by selecting the "send" icon. This will automatically send the message to Mary without the user having to search through a menu of contact details to find the contact information they need.

The user selectable option "cancel" 75 enables a user to cancel the message without sending it.

It is to be appreciated that many other functions could be provided by a multi-fingerprint input comprising two fingerprints. For example, a multi-fingerprint input may comprise a fingerprint associated with making a call and a fingerprint associated with a set of contact details in which case, in response to the multi-fingerprint input, the processor 3 would configure the apparatus 1 to establish a call to a telephone number in the contact details. Alternatively a multi-fingerprint input may comprise a fingerprint associated with a web browser and a fingerprint associated with a set of contact details in which case, in response to the multi-fingerprint input the processor 3 may configure the apparatus 1 to access a website address stored in the contact details. In other examples, one fingerprint may be associated with the function of making a VoIP (Voice over Internet Protocol) call and another fingerprint may be associated with a set of contact details so that the function associated with the multi-fingerprint input is establishing a VoIP call to an IP (Internet Protocol) address stored in the contact details. In another example one fingerprint may be associated with a positioning function and another fingerprint may be associated with a set of contact details in which case the function associated with the multi-fingerprint input would be to present location information of the contact to the user.

FIG. 6 illustrates a method of enabling access to the functions of the apparatus 1 using a multi-fingerprint input comprising three fingerprints.

Figure 6A:
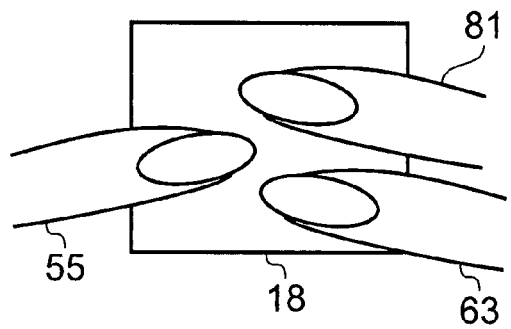
FIGS. 6A and 6B illustrate a second method of making a multi-fingerprint input according to an embodiment of the invention.

In FIG. 6A the user makes a multi-fingerprint input. In the particular embodiment illustrated in FIG. 6A the multi-fingerprint input comprises the user pressing their left index finger 55, their right index finger 63 and their right middle finger 81 on the fingerprint input device 18 simultaneously. In other embodiments a multi-fingerprint input may be made by pressing the fingers on the fingerprint input device 18 sequentially. It is to be appreciated that although the two index fingers and the right middle finger are used in this example, the multi-fingerprint input could comprise any three of the users fingers and thumbs.

The processor 3 will process the multi-fingerprint input which comprises three fingerprints in the same way in which it process a multi-fingerprint input comprising two fingers. That is the processor 3 will identify each of the fingerprints within the multi-fingerprint input and the functions associated with the fingerprints, determine what the combination of those functions is and then enable access to that function.

Figure 6B:
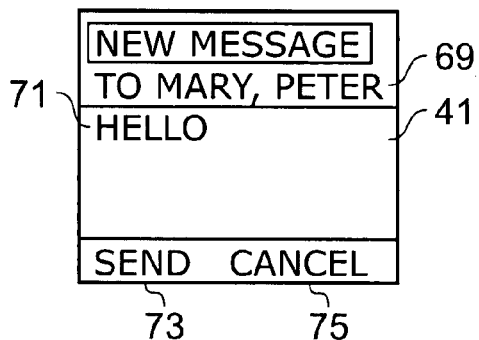

For example, in the embodiment illustrated in FIG. 6, as with the previous example the left index finger 55 is associated with the function of sending an SMS message and the right index finger 63 is associated with the contact details for the user's friend Mary. The middle finger 81 of the right hand is associated with the contact details for another of the user's friends, Peter. In response to the multi fingerprint input the processor 3 will determine whether or not the contact information for Mary and Peter includes an address, such as a mobile telephone number, to which an SMS message may be sent. If the contact information for both Mary and Peter does include a suitable address then the processor 3 will determine that the function associated with the multi-fingerprint input is sending an SMS message to both Mary and Peter and will provide a graphical use interface 41 comprising an SMS message template 69 which is addressed to both Mary and Peter as illustrated in FIG. 6B.

It is to be appreciated that other multi-fingerprint inputs comprising three fingerprints may be associated with a number of different other functions. For example, a multi-fingerprint input may comprise a fingerprint associated with making a call and two fingerprints associated with a set of contact details in which case, in response to the multi-fingerprint input, the processor 3 would configure the apparatus 1 to establish a conference call to the telephone numbers in the contact details. Alternatively a multi-fingerprint input may comprise a fingerprint associated with a web browser and two fingerprints associated with a set of contact details in which case, in response to the multi-fingerprint input the processor 3 may configure the apparatus 1 to open two browsers or two windows within a single browser and access the two website addresses stored in the contact details simultaneously.

The user of the apparatus 1 may be able to select which functions they wish to associate with each fingerprint so that the apparatus 1 is easier for them to use or so that it is easier for them to remember which of their fingers are associated with the various functions of the apparatus 1. For example a user may wish to associate the functions and contact details which they use most often with the fingerprints which they find easiest to use. For instance the user may find it easier to use their thumbs to actuate the fingerprint input device 18 and so may associate the contact details of their best friends with their thumbs. Alternatively a user may find it easier to make a fingerprint input with the fingers of a particular hand so may associate the fingers of this hand with the functions they use most often.

In some embodiments of the invention it may be possible for the user to associate more than one function with a single fingerprint. For example a user may associate the fingers of their left hand with application functions and the fingers of their right hand with parameter functions. A user may be able to associate a plurality of parameter functions with each of the fingers of their right hand so that each of the parameter functions may be used to implement a different one of the application functions.

As an illustrative example a user may associate the thumb of their left hand with the function of playing audio files, the index finger of their left hand with viewing mobile television, the middle finger of their left hand with a web browser, the ring finger of their left hand with a messaging function such as email messaging and the little finger of their left hand with the function of establishing a phone call. The user could then associate each of the fingers of their right hand with a plurality of parameter functions. For example each of the fingers of the right hand may be associated with a particular set of contact details, a particular television channel and a particular set of audio files. If a user makes a multi-fingerprint input comprising their left thumb and a finger from their right hand then the processor 3 will determine that the particular set of audio files associated with the finger from their right hand is an item of information that may be used to implement the audio player function and will enable the apparatus to play the particular set of audio files. If a user makes a multi-fingerprint input comprising their right index finger and a finger from their right hand then the processor 3 will determine that the television channel is an item of information that may be used to implement the function of mobile television and will enable the apparatus to display the selected television channel. If a user makes a multi-fingerprint input comprising any of the middle, ring or little finger of their left hand and a finger of their right hand then the processor 3 will determine that the contact information comprises an item of information that may be used to implement the web browser, email or call functions and will provide a shortcut to the appropriate function.

It also to be understood that a multi-fingerprint input may comprise any number of fingerprints and not just two or three fingerprints as in the illustrated embodiments.

For example a multi-fingerprint input may comprise four fingerprints. A first fingerprint may be associated with the function of establishing a phone call, a second fingerprint may be associated with function of a web browser and the other two fingerprints may be associated with two sets of contact details. In response to the multi-fingerprint input two functions may be performed simultaneously. The processor may configure the apparatus to open a web browser so that two websites associated with contact details may be accessed and also establish a conference call to the two contacts.

Although embodiments of the present invention have been described in the preceding paragraphs with reference to various examples, it should be appreciated that modifications to the examples given can be made without departing from the scope of the invention as claimed. For example in the above described embodiments the processor determines the function associated with the multi-fingerprint input by determining the functions associated with each of the fingerprints within the multi-fingerprint input and then working out what the combination of those functions is. In other embodiments the functions associated with each multi-fingerprint input may be stored in a look up table which is used by the processor.

Also, in the above described embodiments the fingerprints within any given multi-fingerprint input all belong to a single user. In other embodiments a multi-fingerprint input may comprise fingerprints from more than one user. This may be useful in apparatus which stores or provides access to highly confidential information which may not be accessed by only one person. For example apparatus used in military bases or nuclear power stations.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
    memory storing user fingerprint information, the user fingerprint information comprising at least two fingerprint identifiers each serving to identify a fingerprint of the user, each of the fingerprint identifiers being associated with a function of the apparatus;
    a user input device configured to detecting a multi-fingerprint input, the multi-fingerprint input comprising at least two data inputs by a user, each of the two data inputs conforming to one of the fingerprint identifiers
    memory storing computer program code;
    a processor;
    the memory and the computer program code configured to, with the processor, cause the apparatus to:
    associate each of the data inputs comprising the multi-fingerprint input with a corresponding one of the fingerprint identifiers;
    in response to the association of the data inputs with the fingerprint identifiers, determine a function associated with each of the data inputs;
    evaluate whether two or more of the functions can be combined;
    if two or more of the functions can be combined, construct a combination function associated with the multi-fingerprint input and comprising the functions associated with at least two of the data inputs, at least one of the functions serving to modify the operation of at least one of the other functions; and
    enable access to the combination function.

2. An apparatus as claimed in 1 wherein the processor enables access to the combined function by providing a shortcut to the function.

3. An apparatus as claimed in claim 1 wherein the user input device enables a user to program the apparatus by assigning a function to a fingerprint identifier associated with each of his or her fingerprints.

4. An apparatus as claimed in claim 1 wherein each of the data inputs is a print of a finger or a thumb of the user which enables the finger or thumb to be uniquely identified.

5. An apparatus as claimed in claim 1 wherein the multi-fingerprint input comprises a plurality of data inputs provided substantially simultaneously.

6. An apparatus as claimed in claim 1 wherein the multi-fingerprint input comprises a plurality of data inputs provided substantially sequentially.

7. An apparatus as claimed in claim 1 wherein the multi-fingerprint input comprises data inputs conforming to two fingerprints identifiers.

8. An apparatus as claimed in claim 1 wherein the multi-fingerprint input comprises data inputs conforming to more than two fingerprints identifiers.

9. An apparatus as claimed in claim 1 wherein at least one fingerprint identifier is associated with an application function and at least one fingerprint identifier is associated with a parameter function.

10. An apparatus as claimed in claim 9 wherein the processor is configured to determine whether or not the functions associated with the fingerprints identifiers within the multi-fingerprint input can be combined by determining whether or not the parameter function comprises an item of information which can be used to implement the application function.

11. An apparatus as claimed in claim 1 wherein, in order to determine the function associated with the multi-fingerprint input, the processor will determine the function associated with each of the fingerprints identifiers and then determine the combination of these functions.

12. An apparatus as claimed in claim 11 wherein, if the processor determines that the functions associated with the fingerprints identifiers cannot be combined, the processor will cause the apparatus to present information to the user indicating that the functions associated with the fingerprints within the multi-fingerprint input cannot be combined.

13. A method comprising:
    detecting a multi-fingerprint input comprising a plurality of user fingerprints where each individual fingerprint is associated with a function of an apparatus;
    identifying each of the user fingerprints within the multi-fingerprint input;
    determining, in response to the identification of each of the fingerprints, a function of the apparatus;

evaluating whether two or more of the determined functions can be combined;
if two or more of the functions can be combined, combining the determined functions to create a combination function associated with the multi-fingerprint input; at least one of the functions serving to modify the operation of at least one of the other functions and
enabling access to the combination function associated with the multi-fingerprint input.

14. A method as claimed in claim 13 wherein a shortcut is provided to enable access to the function associated with the multi-fingerprint input.

15. A method as claimed in claim 13 comprising enabling a user of the apparatus to program the apparatus by assigning functions to each of their fingerprints.

16. A method as claimed in claim 13 wherein a fingerprint input is a print of a finger or a thumb of the user which enables the finger to be uniquely identified.

17. A method as claimed in claim 13 wherein the multi-fingerprint input comprises a plurality of fingerprints input substantially simultaneously.

18. A method as claimed in claim 13 wherein the multi-fingerprint input comprises a plurality of fingerprints input sequentially.

19. A method as claimed in claim 13 wherein the multi-fingerprint input comprises two fingerprints.

20. A method as claimed in claim 13 wherein the multi-fingerprint input comprises more than two fingerprints.

21. A method as claimed in claim 13 wherein at least one fingerprint within the multi-fingerprint input is associated with an application function and at least one fingerprint within the multi-fingerprint input is associated with a parameter function.

22. A method as claimed in claim 21 wherein the processor determines whether or not the functions associated with the fingerprints within the multi-fingerprint input can be combined by determining whether or not the parameter function comprises an item of information which can be used to implement the application function.

23. A method as claimed in claim 13 wherein in order to determine the function associated with the multi-fingerprint input the functions associated with each of the fingerprints within the multi-fingerprint input are determined and then the combination of these functions is determined.

24. A method as claimed in claim 23 wherein if it is determined that the functions associated with the fingerprints within the multi-fingerprint input cannot be combined then information indicating that the functions associated with the fingerprints within the multi-fingerprint input cannot be combined is presented to a user of the apparatus.

25. A non-transitory computer readable memory medium storing a sequence of instructions, the execution of which result in operations comprising:
detecting a multi-fingerprint input comprising a plurality of user fingerprints where each individual fingerprint is associated with a function of an apparatus;
identifying each of the user fingerprints within the multi-fingerprint input;
determining, in response to the identification of each of the fingerprints, a function associated with the fingerprint;
evaluating whether two or more of the determined functions can be combined;
if two or more of the determined functions can be combined, constructing a combination function associated with the multi-fingerprint input and comprising the functions associated with at least two of the fingerprints; and
enabling access to the combination function associated with the multi-fingerprint input.

26. The memory medium as claimed in claim 25, wherein the operations further comprise:
displaying a graphical interface to a user, the graphical interface presenting a menu including an option to register user fingerprints;
upon selection by the user of the option to register fingerprints, presenting a further selection of interfaces allowing the user to provide fingerprint data for one or more fingerprints of the user and associate a function with the fingerprint data for each of the fingerprints of the user.

27. The memory medium as claimed in claim 26, wherein functions that may be associated with fingerprint data include one or more application functions and one or more sets of parameters that may be used by the one or more application functions.

28. An apparatus comprising: a touch sensitive display device; memory storing computer program code; a processor; the memory and the computer program code configured to, with the processor: cause the touch sensitive display device to present a graphical user interface comprising at least a selection to register user fingerprints; upon detection of a user selection to register user fingerprints, cause the touch sensitive display device to present an interface allowing for the user to provide fingerprint information for each of one or more fingerprints of the user and to select a function to be associated with each fingerprint for which fingerprint information is provided; upon detection of a multi-fingerprint input comprising multiple user fingerprints: identify each fingerprint comprising the multi-fingerprint input; identify the function associated with each fingerprint; evaluate whether two or more of the functions can be combined; if two or more of the functions can be combined, combine the identified functions into a combination function associated with the multi-fingerprint input and comprising the functions associated with at least two of the fingerprints, at least one of the functions serving to modify the operation of at least one of the other functions; and enable access to the combination function.

29. A user interface comprising: a device for detecting a multi-fingerprint input, the multi-fingerprint input comprising data inputs representing a plurality of user fingerprints where each fingerprint is associated with a different function; wherein, the user interface is configured, in response to the detection of the multi-fingerprint input, to: identify a function associated with each of the fingerprints represented by the data inputs; evaluate whether two or more of the functions can be combined; if two or more of the functions can be combined, combine the identified functions to construct a combination function associated with the multi-fingerprint input and comprising the functions associated with at least two of the data inputs, at least one of the functions serving to modify the operation of at least one of the other functions; and enable access to the combination function.

* * * * *

UNITED STATES PATENT AND TRADEMARK OFFICE
CERTIFICATE OF CORRECTION

PATENT NO. : 8,023,700 B2  
APPLICATION NO. : 11/881485  
DATED : September 20, 2011  
INVENTOR(S) : Riionheimo Page 1 of 1

It is certified that error appears in the above-identified patent and that said Letters Patent is hereby corrected as shown below:

Claim 1, col. 11, line 60 delete "detecting" and insert --detect--.

Claim 7, col. 12, line 35 delete "fingerprints" and insert --fingerprint--.

Claim 8, col. 12, line 38 delete "fingerprints" and insert --fingerprint--.

Claim 10, col. 12, line 45 delete "fingerprints" and insert --fingerprint--.

Claim 11, col. 12, line 52 delete "fingerprints" and insert --fingerprint--.

Claim 12, col. 12, line 56 delete "fingerprints" and insert --fingerprint--.

Claim 13, col. 12, line 62 delete "fingerprints" and insert --fingerprint--.

Signed and Sealed this  
Twenty-eighth Day of February, 2012

David J. Kappos  
*Director of the United States Patent and Trademark Office*